United States Patent [19]

Ekstrom et al.

[11] Patent Number: 4,567,759
[45] Date of Patent: Feb. 4, 1986

[54] METHOD AND APPARATUS FOR PRODUCING AN IMAGE LOG OF A WALL OF A BOREHOLE PENETRATING AN EARTH FORMATION

[75] Inventors: Michael P. Ekstrom, Redding; David S. K. Chan, Bethel, both of Conn.

[73] Assignee: Schlumberger Technology Corporation, New York, N.Y.

[21] Appl. No.: 682,817

[22] Filed: Dec. 18, 1984

Related U.S. Application Data

[63] Continuation of Ser. No. 437,064, Oct. 27, 1982, abandoned.

[51] Int. Cl.$^4$ ............................................. G01V 1/40
[52] U.S. Cl. .................................... 73/152; 340/853; 324/355
[58] Field of Search ................ 73/151, 152; 340/853; 364/422; 324/355

[56] References Cited

U.S. PATENT DOCUMENTS

| | | | |
|---|---|---|---|
| 3,321,770 | 5/1967 | Pittman | 346/110 |
| 3,402,388 | 9/1968 | Tucker | 340/18 |
| 3,490,149 | 1/1970 | Bowers | 73/151 X |
| 3,502,169 | 3/1970 | Chapman, III | 181/0.5 |
| 3,521,154 | 7/1970 | Maricelli | 324/10 |
| 3,680,042 | 7/1972 | Brunn | 340/18 |
| 3,697,937 | 10/1972 | Ingram | 340/15.5 A |
| 3,882,474 | 5/1975 | Cain | 340/853 X |
| 3,952,282 | 4/1976 | Zemanek, Jr. | 340/15.5 |
| 3,986,163 | 10/1976 | Elliott | 340/15.5 |
| 4,010,476 | 5/1977 | Elliott | 346/1 |
| 4,131,875 | 12/1978 | Ingram | 73/152 X |
| 4,293,933 | 10/1981 | Park et al. | 73/152 X |
| 4,343,021 | 8/1982 | Frame | 358/213 |
| 4,348,748 | 9/1982 | Clavier et al. | 367/25 |
| 4,484,139 | 11/1984 | Bravenec | 324/355 X |

FOREIGN PATENT DOCUMENTS 685727  5/1964  Canada ................................... 324/7

OTHER PUBLICATIONS

"The High Resolution Dipmeter Tool" by L. A. Allaud and J. Ringot, Reprinted from "The Log Analyst", May–Jun. 1969.

*Primary Examiner*—John W. Caldwell, Sr.
*Assistant Examiner*—Vincent P. Kovalick
*Attorney, Agent, or Firm*—Stephen L. Borst; Louis H. Reens

[57] ABSTRACT

A technique is described for producing an image log of an investigation of the wall of a borehole with a high resolution tool. The tool employs sensors for measuring a characteristic such as the conductivity of the wall at locations which circumferentially overlap. An accurate tool depth measuring device is employed to modify the measured characteristic so that the measurement can be displayed as a linear function of depth without visually detectable artifacts. Various signal processing and image enhancing techniques are described to produce an image log on which the characteristic can be seen as a variable intensity image in which small scale variations of the measured characteristic remain discernable and significant features visually stand out from the log.

28 Claims, 15 Drawing Figures

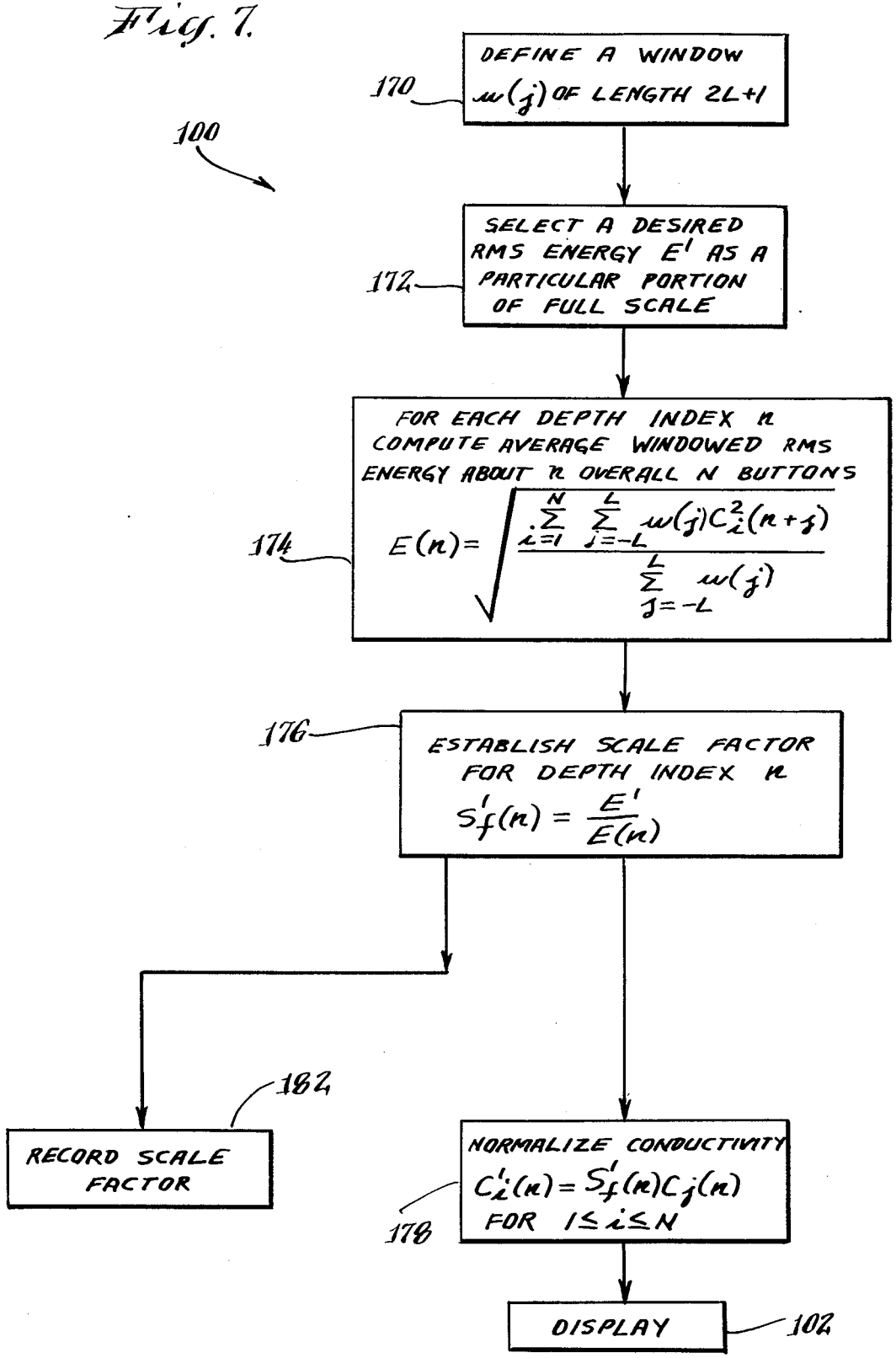

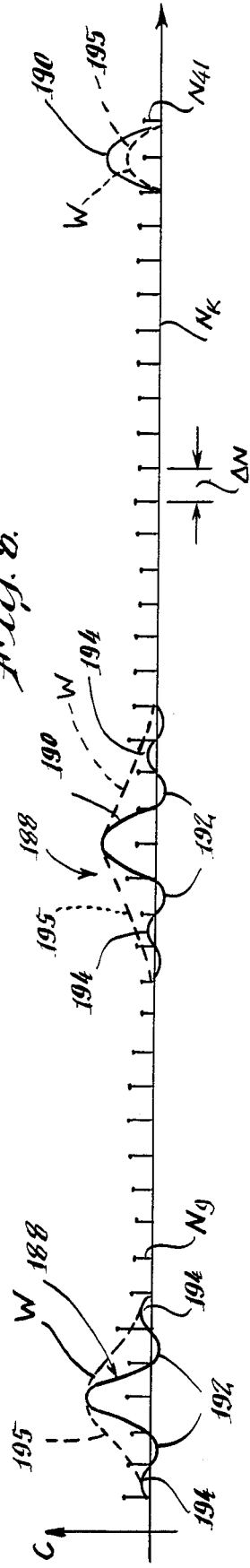
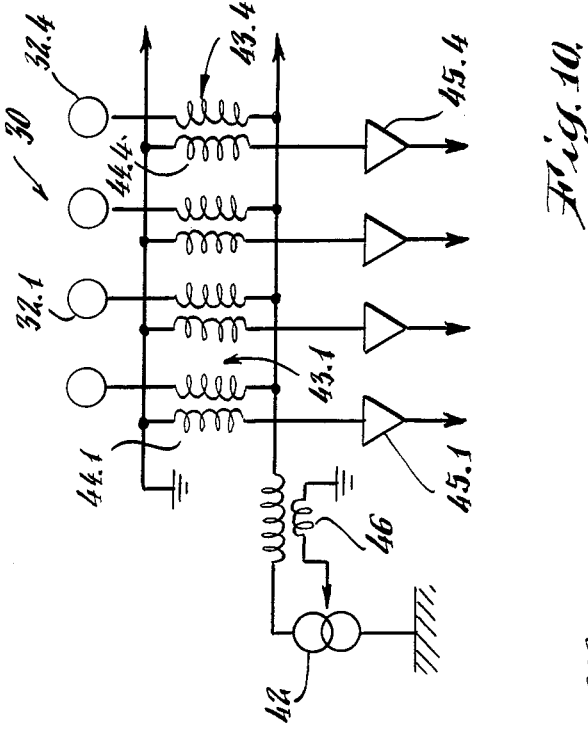
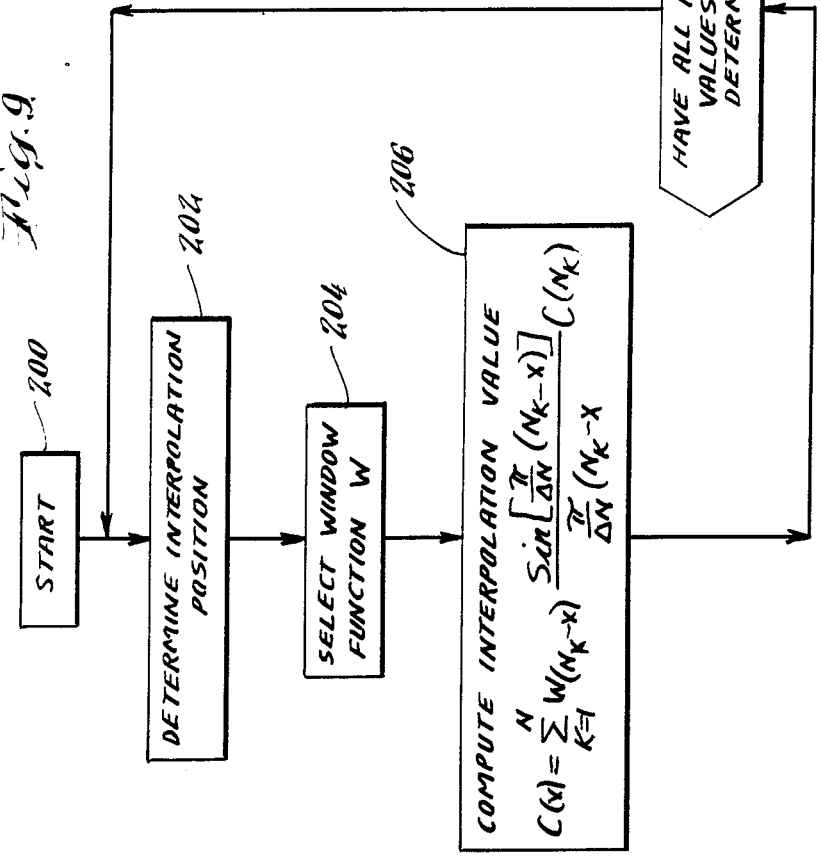

METHOD AND APPARATUS FOR PRODUCING AN IMAGE LOG OF A WALL OF A BOREHOLE PENETRATING AN EARTH FORMATION

This is a continuation of co-pending application Ser. No. 437,064 filed on Oct. 27, 1982 now abandoned.

FIELD OF THE INVENTION

This invention relates to an investigation of a wall of a borehole which penetrates an earth formation. More specifically, this invention relates to the imaging of data acquired from a high resolution investigation of the wall of a borehole.

BACKGROUND OF THE INVENTION

In the exploration for hydrocarbons, it is highly desirable to precisely identify earth formation features at the various borehole depths. Many of these features have a fine structure which often can only be determined from the investigation of a core of the borehole as it is drilled. Coring, however, is an expensive time consuming process and in itself may at times alter the cored specimen so as to degrade the reliability of the interpretations of the features of the earth formation from which the core specimen was drawn.

Some of the features that are highly desirable to identify are fine beddings and facies, the heterogeneity of carbonate deposits and the structure of fractures. The detection of beddings, for example, includes detecting shaly-sand sequences where the shales establish a basal contact for each sequence. Facies identification involves identifying the lithology between basal contacts, a type of partitioning of a well log into regions that can be analyzed in greater detail. The analysis of carbonates involves detecting non-homogenous features such as are due to irregular cementation, variations in the pore sizes, small scale lithology changes, etc. Fractures play a major role in the flow characteristics of reservoir rock. Therefore, the measuring or detecting of fractures, determining their orientations, density, height, vertical and lateral continuity is highly desirable.

In a copending patent application entitled "Method And Apparatus For Electrically Investigating A Borehole" filed by Gianzero et al on July 30, 1981, bearing Ser. No. 288,554, now U.S. Pat. No. 4,168,623 and assigned to the same assignee as of this invention, an earth formation investigating tool is described with which borehole wall features of the order of millimeters in size can be detected. The tool includes an array of small crossection survey electrodes (buttons) which are pressed towards the borehole wall and each button injects an electric current into the adjoining formation. The individual button currents are monitored and signals representative of button currents are recorded as curves as a function of depth. The measured button currents reflect the resistivity of the material in front of each button. In order to achieve a high resolution investigation, the electrodes are arranged in an array of multiple rows. The electrodes are so placed at intervals along a circumferential direction about the borehole axis as to inject survey currents into borehole wall segments which overlap with each other to a predetermined extent as the tool is moved along the borehole wall. In this manner a detailed high resolution resistivity or conductivity investigation of the borehole wall can be made.

A high resolution investigation of a continuous segment of an earth formation around a borehole may be done with measuring devices that are vertically spaced from each other on the investigating tool, but whose respective measurements at a common depth are to be depth correlated by depth shifting. In such case the depth shifting need only be by an amount that is a function of the velocity of the tool. Such velocity is typically measured by monitoring the velocity of the cable from which the tool is suspended. The motion of the tool itself, however, is not always equal to the cable velocity since the tool often sticks then slips and rapidly moves ahead as cable tension increases or the tool oscillates up and down, much like a yo-yo, at the end of a long flexible cable. Hence, simple monitoring of cable velocity at the surface is not a precise measurement of tool motion at any one instant of time so that depth shifting of high resolution measurements often involves inaccuracies attributable to non-uniform tool velocity.

Techniques have been proposed to determine tool velocity so as to be able to make a correct correlation of the measured parameters. One such technique as employed in a dipmeter, which is a bedding angle detector, involves a pair of electrodes which are vertically spaced from each other by a known small distance. Survey currents injected by these electrodes should be the same except for a small constant displacement. Where such displacement is not constant, the tool velocity is known to vary. A good description of such technique is found in an article entitled "The High Resolution Dipmeter Tool" by L. A. Alland and J. Ringot and published in The Log Analyst of May-June 1969.

As described in the latter article, the measurement of the velocity of the tool may be obtained by correlating the survey currents from the electrodes which are vertically spaced from each other by a known small distance. The correlation may then yield a measurement of the actual tool velocity so that the true distance by which data must be depth shifted for proper depth correlation can be determined. Such technique, however, requires continuous correlation computations over a substantial interval for proper speed correction and is subject to errors because of a smearing effect of the correlation and when the survey currents from the electrodes do not correlate well such as during a stick and slip condition of the tool.

In another technique for determining the actual speed of the tool, accelerometers are used which provide precise measurement of tool velocity if the integration of accelerometer data does not include significant errors. As a practical matter, however, the accelerometer data alone is not sufficiently accurate to enable the accurate depth shifting of high resolution data from a high resolution investigation of a borehole wall.

Although the high resolution investigation with a tool as described in the aforementioned Gianzero application yields significant information about the borehole wall, it becomes quite cumbersome to display such information in the conventional wiggle trace format. For example, as illustrated with reference to FIG. 2 herein, the large number of electrode buttons employed in an investigation yield in the aggregate a large number of traces that are difficult to analyze.

SUMMARY OF THE INVENTION

With a technique in accordance with the invention, a high resolution investigation of a borehole wall can be made in a practical visually acceptable manner that is particularly suitable for a high resolution tool such as described in the aforementioned Gianzero et al patent application. With such technique a plurality of high spatial resolution signals are generated which are respectively representative of a borehole wall characteristic; for example, its conductivity, at discrete locations. The signals in the aggregate represent such characteristic over a vertically and circumferentially continuous segment of the borehole wall.

The signals are then modified by removing effects such as tool velocity variations, and perturbations attributable to variations in the borehole environment and signal amplifiers in the tool. This modification enables subsequent signal enhancements with which the signals can be displayed in a manner that approaches the character of a visual image from inside the borehole of the borehole wall characteristic. Since the human eye is highly perceptive, fine high resolution features of the characteristic can be visually discerned and interpreted.

The term high resolution as employed herein refers to the ability to spatially resolve fine features of the measured characteristic from a visual image of such characteristic. Such fine feature include minute variations of the characteristic in the circumferential as well as vertical directions along the borehole wall. For example, in a conductivity image obtained in accordance with the invention, high resolution features can be observed such as vugs, small stratigraphy beds and their circumferential thickness variations, small scale lithology changes, pore sizes, fractures and their density and height, and their vertical and lateral continuity. Finer details may be observed. With a borehole wall image formed in accordance with the invention features of the characteristic of the borehole wall are revealed whose circumferential dimensions are at least smaller than about four percent of the circumference of the borehole wall. When a technique of this invention is employed to acoustically investigate a borehole wall formed by the casing and the cement bond behind the casing, the term high resolution refers to the ability to spatially resolve features such as small thickness variations of the casing and circumferentially narrow vertically oriented separations between the casing and the cement. Generally high resolution features of the order of several millimeters in magnitude can be observed from a visual image formed in accordance with the invention.

A principal aspect of this invention is the investigation of a borehole wall characteristic whose spatial variations are small yet can be measured and displayed in a visual image. The term characteristic as referred to herein, therefore, primarily relates to small scale events such as vugs, small stratigraphy beds, pores, small fractures and other fine detailed features. These events may have a thickness as small as several millimeters.

As part of a technique in accordance with the invention, the characteristic signals, which are originally measured at regular time intervals, are accurately converted to signals representative of the borehole wall characteristic as a linear function of borehole depth. The conversion involves a measurement of the borehole depth to which the characteristic signals relate with a precision that is of the same order as the high spatial resolution of the signals.

This technique is particularly useful in a microconductivity investigation of the earth formation with tools as described in the aforementioned copending Gianzero et al application. Such tool employs an array of small diameter survey electrodes arranged in multiple horizontal rows on a pad that is pressed towards the borehole wall. The electrodes are laterally spaced from each other in a particular manner so as to circumferentially overlap when projected along a common depth line. Currents injected by the electrodes are sampled as indicative of the conductivity of the borehole wall opposite the electrodes. After processing of the samples such as their conversion to samples of conductivity as a linear function of depth, the samples from all the rows of electrodes in the array are depth shifted to a common depth. This produces a high density of circumferential samples with which a high resolution conductivity image may be produced by recording amplitudes of the samples as variable image intensities.

Factors such as mudcake or a lift-off condition of the tool may cause visually apparent artifacts in the image logs. Similar artifacts may be caused by variations in the gains or off-sets of electronic signal processing devices used to process the electrode current measurements. These artifacts appear as longitudinal alternating dark and light bands. In accordance with one technique of the invention, such artifacts are removed by an equalization process of the signals representative of the conductivity of the borehole wall. Equalizing of the variations may be obtained by determining deviations of the signals at common depth intervals from an average of such signals as measured over regions which effectively surround the common depth intervals. The signals at the common depth intervals are then altered in accordance with the determined deviations.

A particularly effective technique of the invention involves a compression of characteristic signals with a variable scale factor in such manner that a visual image display of significant features of the earth formation can be made over the full dynamic range of the characteristic represented by the signals. This is obtained by evaluating the amplitudes of the signals over a range of depth intervals and applying the evaluation as a scale factor to control the intensity of the image at the center of the range of intervals. As a result, extreme values of the characteristic can be properly imaged though the absolute scale value of the image log is varied. The variable scale factor can be recorded alongside the image log to provide an indication of absolute values. This image compression technique is particularly effective where conductivity of the earth formation is imaged. Conductivity typically has a dynamic range of the order of $10^4$ so that use of a variable scale factor enables use of an image log grey scale with which small scale variations in both low and high conductivity formations can be observed.

It is, therefore, an object of the invention to provide an image display of an investigation of a borehole wall so that high resolution features of the wall can be observed. It is a further object of the invention to provide a method and apparatus for generating an image log of a characteristic of a borehole wall.

These and other advantages and objects of the invention can be understood from the following detailed description of a preferred embodiment in accordance with the invention and described in conjunction with the drawings.

BRIEF DESCRIPTION OF DRAWINGS

FIG. 3A is a diagrammatic representation of a sampling technique used in forming an image log in accordance with the invention;

FIG. 7 is a flow chart for a technique used to shift the scale of an image log formed in accordance with the invention;

FIG. 8 is a diagrammatic representation for an interpolation technique employed to expand the lateral scale of the image log formed in accordance with the invention;

FIG. 9 is a flow chart of steps employed in applying the interpolation technique of FIG. 8; and FIG. 10 is a schematic diagram of a drive circuit used to energize electrodes used in generating an image log in accordance with the invention.

DETAILED DESCRIPTION OF DRAWINGS

Figure 1:
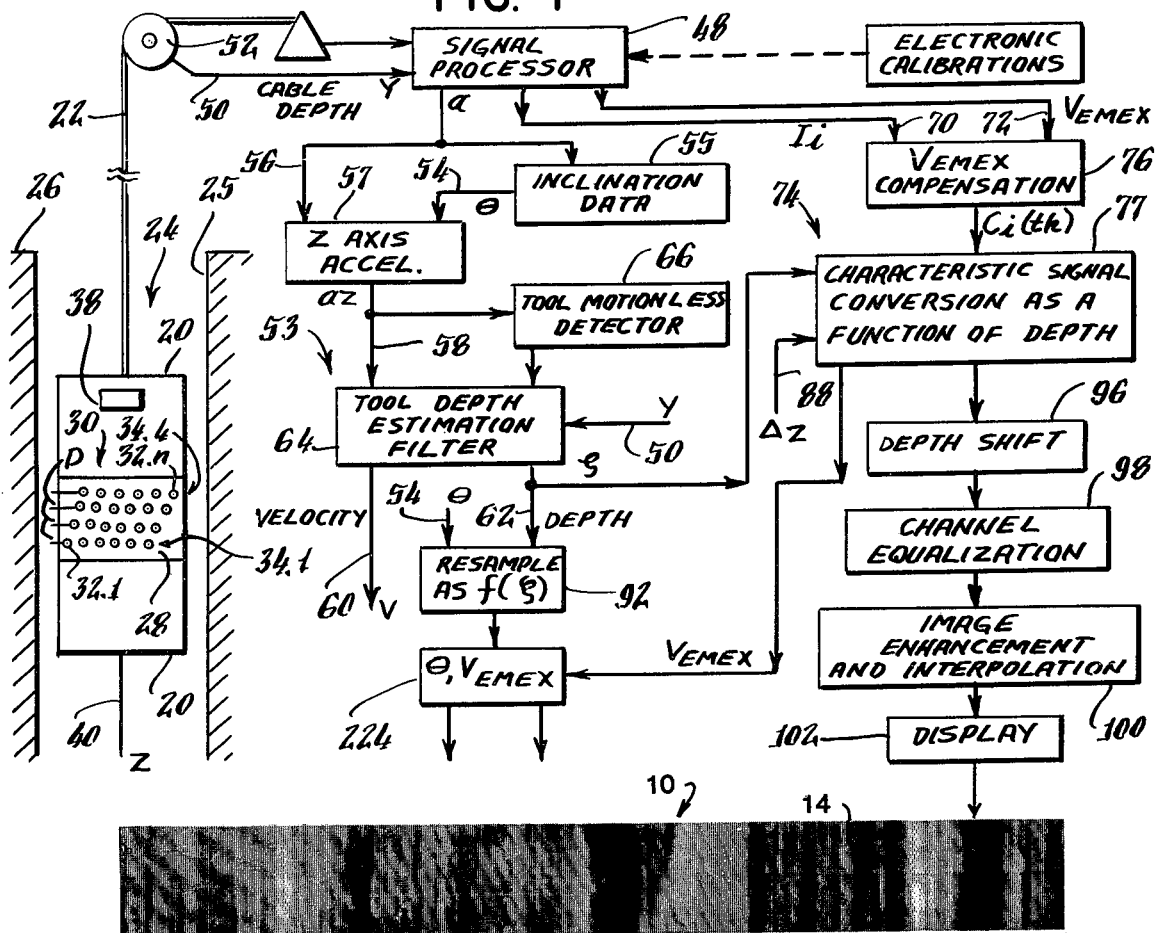
FIG. 1 is a block diagram for a system in accordance with the invention to make an image log as shown in the Figure.

With reference to FIG. 1, an image log 10 made in accordance with the invention is shown. Image log 10 was made with a tool similar to tool 20 which is shown suspended from a cable 22 in a borehole 24 penetrating an earth formation 26. Tool 20 includes a segment 28 on which an array 30 of survey electrodes 32 are placed in a manner as more particularly described in the aforementioned patent applications to Ekstrom et al and Gianzero et al and which description is incorporated herein by reference thereto. The array 30 is formed of rows 34 of electrodes 32 which are laterally so displaced that as the tool 20 is pulled up by cable 22 during an investigation, the array of electrodes investigates overlapping locations of the earth formation. In this manner a segment of the borehole wall 25 is investigated with high resolution, of the order of millimeters.

The electrodes 32 are in the shape of circular buttons and the rows 34, although close to each other, are spaced by small distances D. The electrodes 32 may have a diameter as small as about five millimeters and the separation D between the rows 34 may be of a comparable dimension of about a cm. When the survey currents of the buttons 32 are sampled for the entire array 30 and the samples subsequently depth shifted to a common depth interval, the number of earth formation locations investigated in the circumferential direction is equal to the number of electrodes in the array 30. The survey currents are sampled at a sufficiently high frequency to obtain an investigation of a continuous segment of the earth formation.

Figure 2:
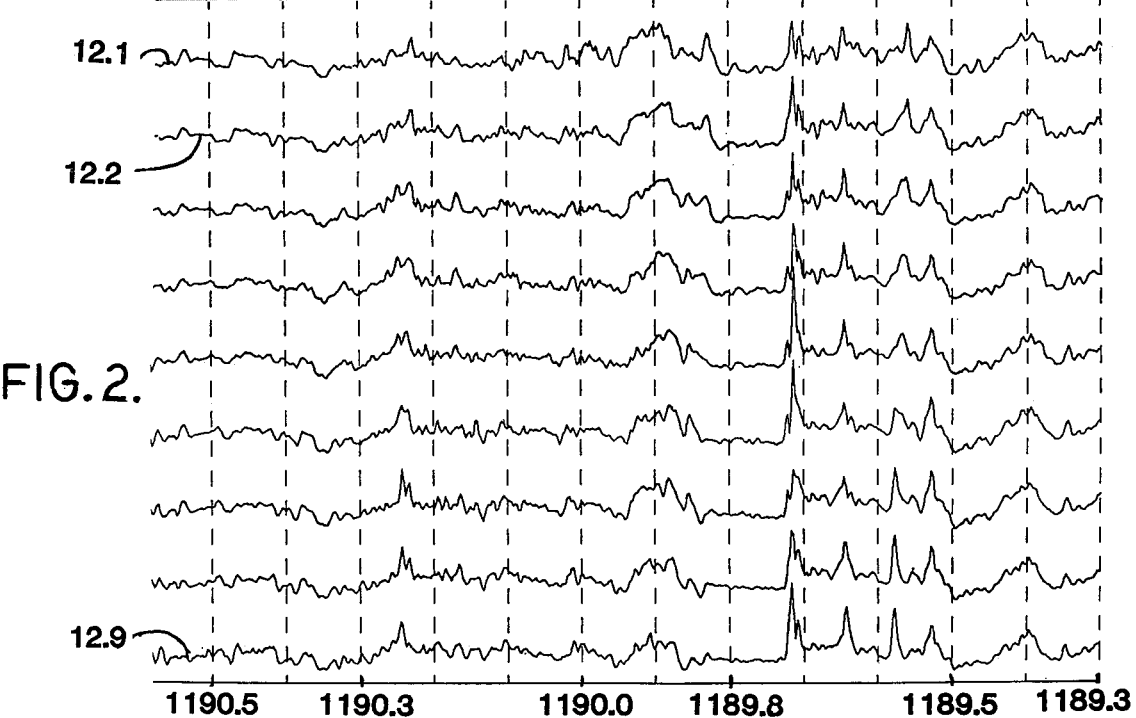
FIG. 2 is a portion of a conventional wiggle-trace type log generated with the measurement acquisition part of the system.

The significance of the invention may be particularly appreciated with reference to FIG. 2 and the image log 10 of FIG. 1. The traces 12 shown in FIG. 2 and the image log 10 relate to the same depth of investigation made with the same tool using an array 30 of nine electrodes 32 spaced from each other in three rows 34. Thus, at 14, depth 1189.55, the image log 10 reveals by virtue of textural changes and high angled cross-bedding, the presence of low porosity, highly cemented limestone. This is not easily observable from conductivity traces such as 12. The image log 10 facilitates a detection of beds and identification of facies, thus enabling a clearer identification of lithology.

Since the velocity of tool 20 is non-uniform as it is drawn up by cable 22, depth shifting of current samples even over small distances D between rows 34 introduces visually observable errors. These errors are of a magnitude comparable to the dimensions of the detailed features sought to be investigated and thus tend to impair the effectiveness of the image log. Accordingly, tool 20 is provided with a local velocity measuring device in the form of orthogonally oriented accelerometers 38. The acceleration of tool 20 along the borehole axis 40 can be derived from the acceleration measurements using well known double integral relationship $$\zeta(t) = \zeta(t_o) - \int_{t_o}^{t} \int_{\sigma_o}^{\sigma} [G_z(\sigma) - g\cos\theta(\sigma)]d\sigma dt.$$

With the use of accelerometers 38 the inclination of borehole 24 relative to the local vertical can be taken into account. The inclination angle can be measured in a manner described in U.S. Pat. No. 4,348,748 and is incorporated herein by reference thereto.

Tool 20 further may include other sensors such as acoustic and calibrating transducers as more particularly described in a copending patent application entitled "Method And Apparatus For Investigating Stand-Off In A Borehole", filed by Ekstrom et al on Mar. 24, 1982 bearing Ser. No. 361,224, said description being incorporated herein by reference thereto.

The currents emitted by electrodes 32 towards the earth formation 26 are preferably maintained within a linear range by controlling the driving voltage to avoid saturation of electronic devices such as sensors, amplifiers and current sources and thus preserve the ability to measure the local conductivity of earth formation 26. This may be explained with reference to FIG. 10 in which a common current source 42 having a drive voltage $V_{EMEX}$ is shown coupled to an array 30 of survey electrodes 32 through isolation networks 43 having current sensors 44. When the conductivity opposite the array 30 is high, the current demand on source 42 also is high and $V_{EMEX}$ may drop due to its internal resistance while amplifiers such as 45 may tend to saturate. Accordingly, the total current from source 42 may be limited, for example, by monitoring total current flow with a sensor such as 46. When the sensed total current becomes too high, $V_{EMEX}$ may be automatically lowered. Such control over $V_{EMEX}$ may be done in tool 20 or with controls on the surface. Since conductivity may vary over a large dynamic range depending upon the nature of the earth formation, the drive voltage, $V_{EMEX}$, for electrodes 32 may continuously vary. Tool 20 thus, in addition to sensing currents emitted by electrodes 32, samples their driving voltage $V_{EMEX}$ as well so as to enable measurements of conductivity.

The term conductivity measurements or signals as used herein includes signals representative of measurements of the current I emitted by the electrodes 32 as well as signals representative of resistivity when the driving voltage is divided by the sensed electrode currents. The term conductivity signals also includes those signals after the digital processing steps as described herein or as may be practiced with other signal processes used to generate an image log of conductivity of a borehole wall.

Data sensed by tool 20 is telemetered, preferably in sampled digital format, along cable 22 to an initial signal processor 48. This may primarily serve to record all the data sensed by tool 20. The stored data may then be subsequently processed off-site by a digital signal processor. For simplicity, FIG. 1 illustrates signal processing as if it is done on-site in a digital data processor.

A cable depth signal, y, is applied on line 50 from a cable depth sensor 52 coupled to cable 22 as it is reeled in during an investigation with tool 20. The cable depth signal includes information as to the amount of cable measured to be inside borehole 24.

As shown in FIG. 1, initial signal processor 48 provides the acceleration data to a tool velocity and depth estimator generally indicated at 53. Such estimator is preferably formed in a manner as more fully described in a copending patent application filed concurrently with this application bearing Ser. No. 437,059, filed on Oct. 27, 1982, and entitled "Method And Apparatus For Measuring The Depth Of A Tool In A Borehole" by D. Chan and assigned to the same assignee as of this invention. The description of this copending application is incorporated herein by reference. Briefly, such tool depth estimator 53 employs information such as the cable depth signal y on line 50, the magnitude of the inclination angle $\theta$ on line 54 from an inclination angle determinator 55 which uses the measured accelerations a on line 56. The acceleration, $a_z$, i.e. along the tool axis z, 40 is determined from a z axis acceleration computer 57 and applied on line 58. An accurate tool velocity signal, v, and tool depth signal, $\zeta$, on lines 60, 62 respectively, are provided with a digital Kalman type filter 64. The depth estimator 53 includes a tool speed discontinuity detector 66 with which a motionless condition of the tool 20 is sensed and then used to modify the operation of filter 64.

Electrical data in the form of digital samples of the currents $I_i$ emitted by electrodes 32 and their driving voltage $V_{EMEX}$ are applied on lines 70, 72 respectively to a portion 74 of a signal processor used to form the image log 10.

Figure 3:
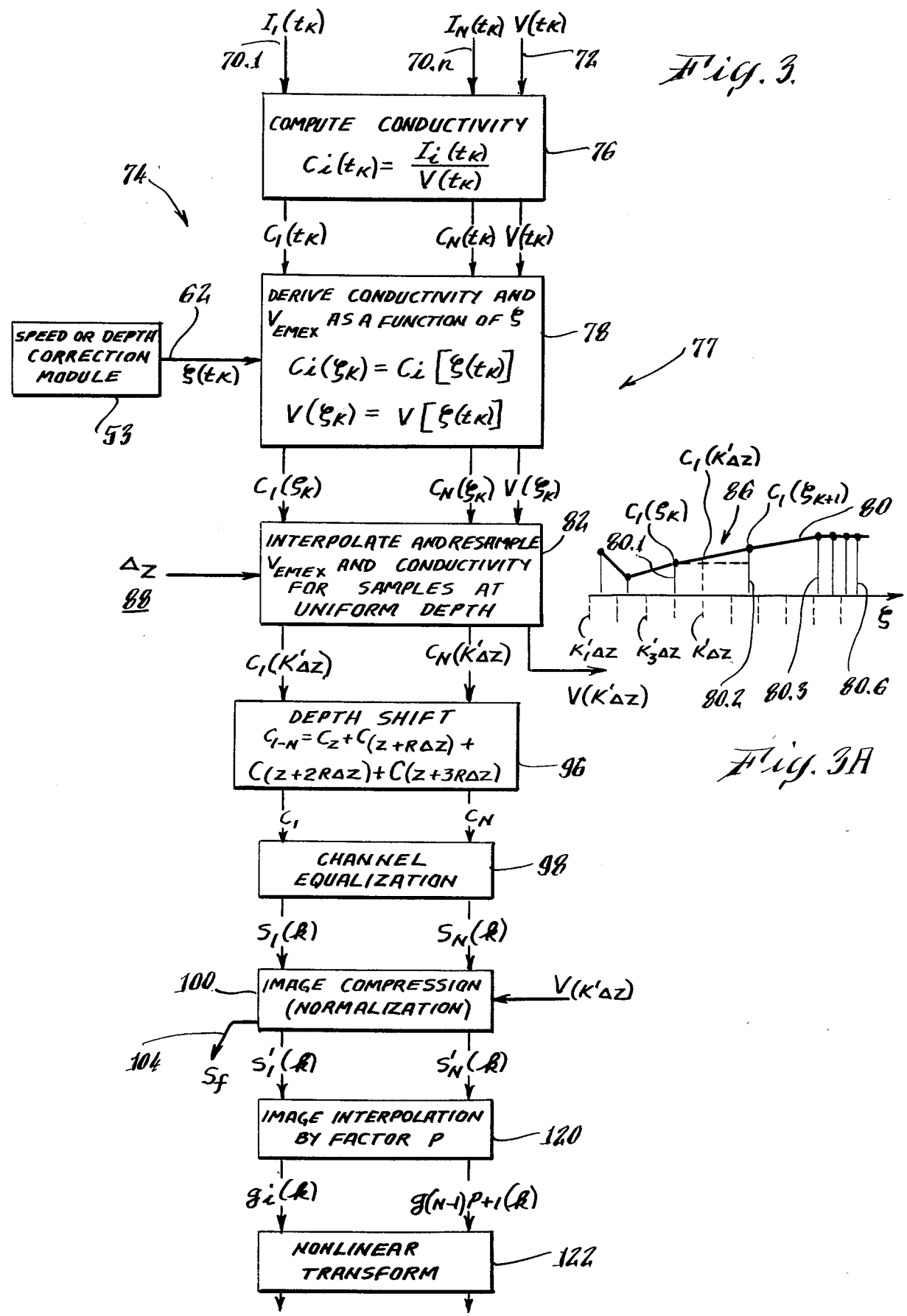
FIG. 3 is a schematic diagram for an image log forming process in accordance with the invention.

With reference to both FIGS. 1 and 3, image log 10 is obtained by processing the sensed current samples of the various electrodes commencing with a voltage compensation step 76. This removes the effect of variations of the driving voltage $V_{EMEX}$ by forming for each electrode 32 a conductivity measurement $C_i$ by dividing the measured current for that electrode $I_i(t_k)$ by the driving voltage $V(t_k)$ in effect at the time of the current measurements for that electrode.

The conductivity measurements $C_i(t_k)$ are ascertained at known instances of time by virtue of a clock controlled sampler, not shown, in tool 20. The generation of tool velocity, v, and depth, $\zeta$, by estimator 53 are similarly related to time. Hence, the conductivity measurements $C_i(t_k)$ from step 76 have a known time relationship with tool velocity V and depth $\zeta$ and occur at regular time intervals but not at regular depth intervals. The conductivity measurements as a function of time are, therefore, converted at 77 to conductivity as a linear function of borehole depth.

This conversion is obtained as shown in FIG. 3 by first deriving conductivity $C(\zeta_k)$ and the driving voltage $V(\zeta_k)$ as a function of corrected depth, $\zeta$, at 78 using the corrected tool depth signal $\zeta$ on line 62. Since the tool depth signal $\zeta$ was determined for the same time intervals $t_k$ used for the conductivity and $V_{EMEX}$ measurements, the generation of conductivity values as a function of tool depth, $C_i(\zeta_k)$, essentially constitutes a matching of the conductivity values with tool depth values at corresponding times.

The conductivity value as derived from step 78 does not vary as linear function of depth as can be seen from curve 80 in FIG. 3a showing connected conductivity sample values as a function of depth $\zeta$ alongside step 82. When the tool 20 is moving at an even speed, the conductivity samples 80.1, 80.2 and 80.3 are properly evenly spaced. When tool 20 begins to slow down the conductivity values 80.3–80.6 tend to bunch together. When the tool is fully stuck, not shown in FIG. 3a, the conductivity values would be superimposed on each other. Since an image log 10, see FIG. 1, uses conductivity values at regular depth intervals, the conductivity values derived as a function of depth by step 78 are converted at 82 to conductivity values as a linear function of borehole depth.

The conversion involves a resampling of a curve such as 80 at regular depth intervals $\Delta z$ as generated by a signal processor at 88. An interpolation is required when as shown in FIG. 3A the uniform depth intervals $\Delta z$ generated at 88 occur between samples $C_i(\zeta_k)$ of conductivity as shown for the conductivity sample $C_i(k'\Delta z)$ at 86 which falls between the samples $C_i(\zeta_k)$ and $C_i(\zeta_{k+1})$. The value of $\Delta z$ is preferably so chosen that the distance D between rows 34 of electrodes 32 (see FIG. 1) is a whole multiple, R, of $\Delta z$. FIG. 3A. illustrates diagrammatically that a straight line interpolation $y=mx+b$ may be used to obtain the interpolated conductivity value $C_i(k'\Delta z)$. The generation of a drive voltage $V_{EMEX}$ that is a linear function of borehole depth may be done in a similar manner for the conductivity values.

As shown in FIG. 1, the inclination angle $\theta$ is resampled in a similar manner at 92 to reproduce the inclination as a linear function of borehole depth.

The conductivity values from step 82 are then depth shifted at 96 to produce in effect a common depth row of conductivity values for borehole wall locations that spatially overlap over a circumferential segment. The depth shifting is carried out commensurate with the number of rows 34 of electrodes 32. When D is selected as a whole multiple R of $\Delta z$, this depth shifting inside a signal processor may merely involve a reorganization of the conductivity measurements in memory. In the embodiment of FIG. 1, there are four rows 34 of electrodes 32 so that conductivity measurements applicable to a common depth, $C_z$, are combined by depth shifting samples of row 34.2 by R times and those of row 34.3 by two R shifts while three R shifts are used for row 34.4. After depth shifting step 96, a number of N samples that are all related to a common depth and which cover a continuous circumferential segment of the earth formation have been assembled. This process is repeated for each depth $k'\Delta z$ so that conductivity samples corresponding to samples of currents from rows 34 and made at common depth intervals, $\Delta z$, are regularly assembled at memory locations for further processing as data related to common borehole depths.

At 98 in FIGS. 1 and 3 a routine is used whereby longitudinal artifacts attributable to variations in the electronics channels used to amplify the sensed electrode currents or borehole and tool related conditions are removed from the conductivity samples. At 100 an image log enhancement is obtained with a variable compression technique that modifies the display of conductivity samples with a variable scale factor, $S_f$. This scale factor is derived at 104 from a continuous analysis of the samples over a range of depth intervals and then applying the scale factor to the samples before display. The scale factor varies automatically so as to enable imaging of high resolution features over the large range of conductivities that may be encountered. The scale factor is obtained from a normalization scheme as will be further explained and may be displayed as a multiplier $S_f$ or divider factor $S'_f$ as appears appropriate. The image enhancement is followed by an interpolation technique for expanding the width of the display. The order in which these processing steps 98, 100 are done may be varied.

Figure 4:
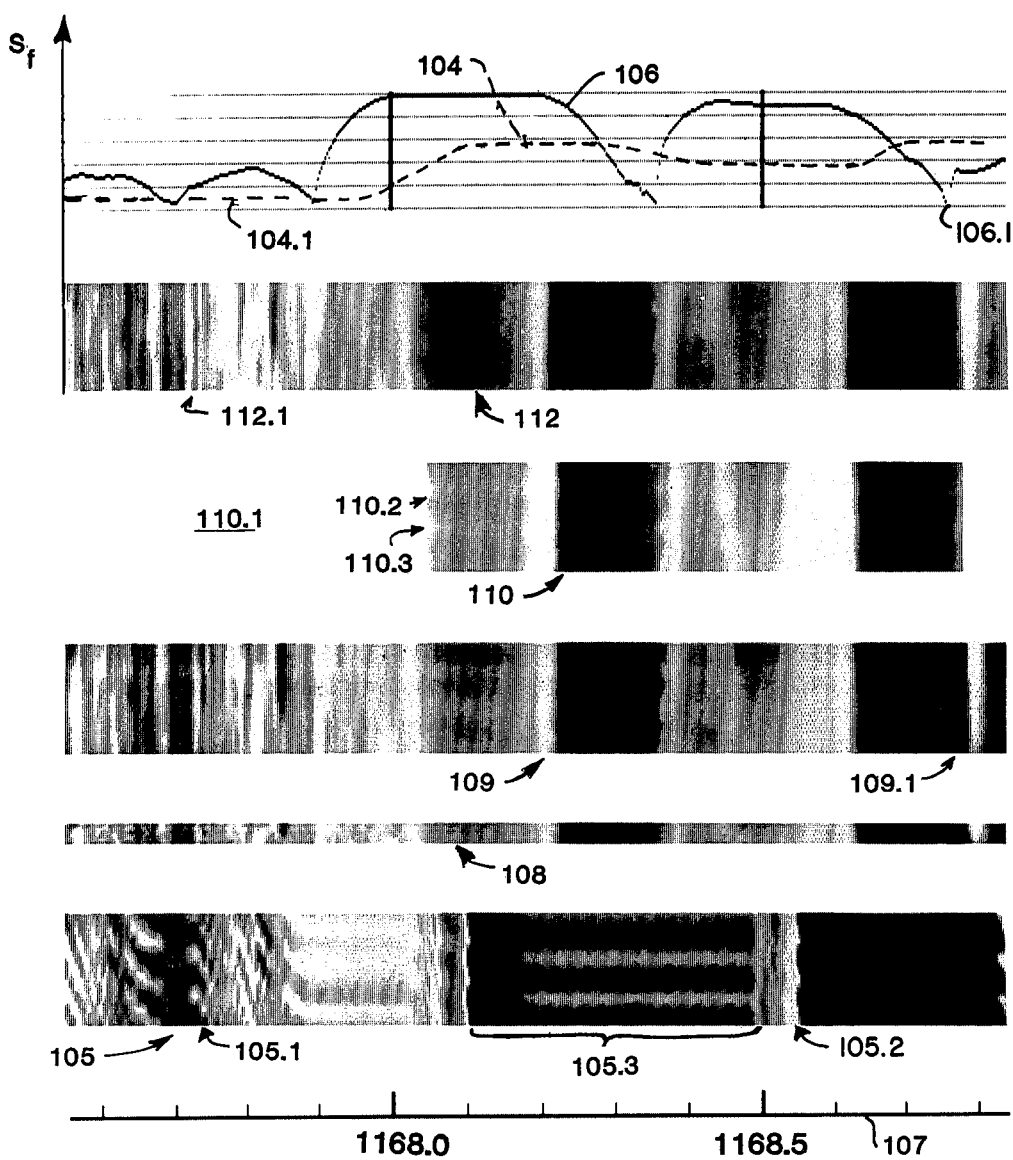
FIG. 4 are logs made of conductivity signals at different processing stages.

At 102 in FIG. 1 the conductivity samples are processed for display using a known pixel technique wherein pixels are defined with variable intensity levels so as to form image log 10 wherein the grey level is a function of the conductivity with darker regions being representative of higher conductivity. Scale factor values $S_f$ are derived from step 100 (see FIG. 3) are made available at 104 as a function of depth for recording alongside image log 10 as shown in FIG. 4. The display process 102 for transforming the conductivity measurements in the form of digital samples to image log 10 involves known digital processing techniques that are commercially available. One such technique, incorporated herein by reference thereto, may employ a device and digital program made by the International Imaging Systems Company of Milpitas, Calif. and is known as its I$^2$S model 70 system.

The display step 102 for making image log 10 extracts conductivity samples representative of successive rows of circumferentially overlapping earth formation locations and visually records the amplitudes of these samples with corresponding intensity variations on a recording medium. The recording medium may be a cathode ray oscilloscope, or a hard copy medium. Devices and techniques for making such visual records are known in the art.

The advantages of the image log 10 formed in accordance with the invention may be further particularly appreciated with reference to FIG. 4 wherein at 105 a laterally expanded image log is attempted with high resolution conductivity samples by using cable depth measurements y as available on line 50, see FIG. 1 to correct for tool speed variations. The resultant display 105 is riddled with various artifacts at 105.1, 105.2 introduced by the yo-yo motions of tool 20. A significant erroneous high conductivity segment is shown at 105.3 due to the tool becoming stuck in this region as evidenced by the tool speed curve 106. The depth scale 107 for display 105 represents cable depth y, but tool depth for all the other displays in FIG. 4.

The application of the depth correction at 78 (see FIG. 1) using the borehole depth signal $\zeta$ eliminates as shown at 108, see FIG. 4, the artifacts of display 105. Display 108, however, by its use of a lateral scale equal to the depth scale 107 does not usually provide an adequate lateral view of the conductivity patterns and, hence, at 109 the display 108 has been laterally expanded by using an image interpolation technique 120 (see FIG. 3) as hereinafter further explained with reference to FIGS. 3, 8 and 9. The lateral expansion a display 109 of currents sensed from the electrodes 32. The display 109 could be employed as an image log since many borehole wall features visually appear. Display 109, however, shows an anomaly at 109.1 which is attributable to a change in the drive voltage $V_{EMEX}$ while the tool is stuck as shown at 106.1. This anomaly is substantially eliminated with the display 110 of conductivity as computed at step 76 shown in FIGS. 1 and 3.

Display 110 represents actual conductivity which, by virtue of its large dynamic range that is much greater than the human eye's ability to distinguish different grey levels, causes region 110.1 to appear all white. In addition, longitudinal shadows of light and dark appearance are present in display 110. These shadows such as dark shadow 110.2 and light shadow 110.3 appear attributable to any one or a number of factors such as the presence of mudcake, or a tilting of the tool or to gain and off-set variations in channels used to process the sensed electrode currents. These shadows are to be a substantial extent eliminated by the equalizing step 98 (see FIGS. 1 and 3) as can be seen from the image log 112.

The dynamic range needed for display 110 is then accommodated with the signal compression step 100 whereby the conductivity data is normalized by a variable scale factor as represented by curve 104. Thus region 110.1 is made to appear as if it has a higher conductivity than it actually has in the image log 112 at 112.1; however, the scale factor 104 shows this by having a value less than one in region 104.1. Thus the relative conductivity values represented by the image log portion 112.1 when multiplied by the scale factor $S_f$ of trace 104 would yield an absolute conductivity value. Image logs such as 112 may be provided with periodically placed calibration segments whereby the grey scale's relative conductivity values can be visually determined. The display 110 at 110.3 has an intensity that is more equal to that of image log 112 in that region and the scale factor reflects this by approaching and remaining near unity for the same region.

The description of FIG. 4 has been made without reference to the order in which the various processing steps are done. For example, the displays 105 and 110 are shown latteraly expanded when as shown in FIG. 3 this is normally done after the other steps have been completed. In some instances, the lateral expansion step may be deleted, for example when the array 30 on tool 20 has a sufficient lateral width or when the high lateral detail need not be observed.

Figure 5A:
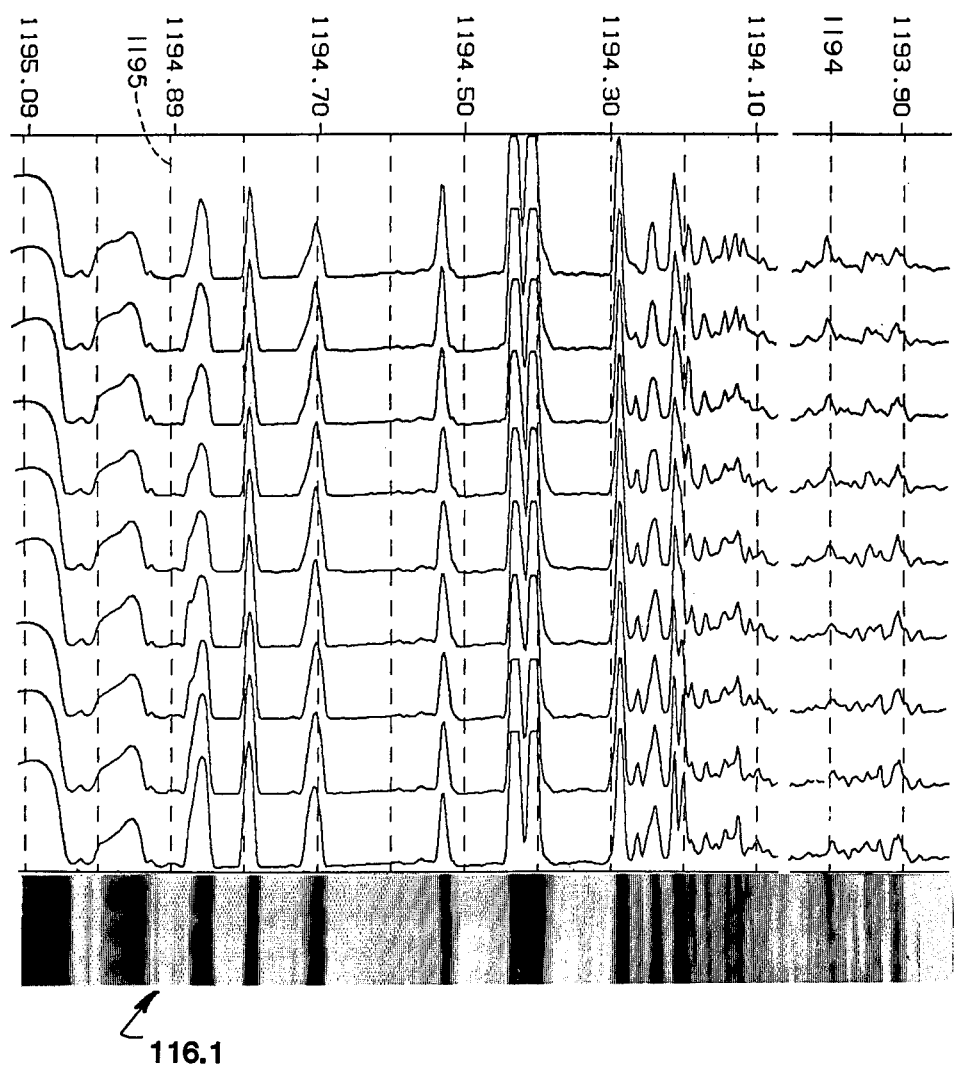
FIGS. 5A through 5E are image logs formed in accordance with the invention placed in depth alignment with conventional line trace logs formed with the same data.
Figure 5B:
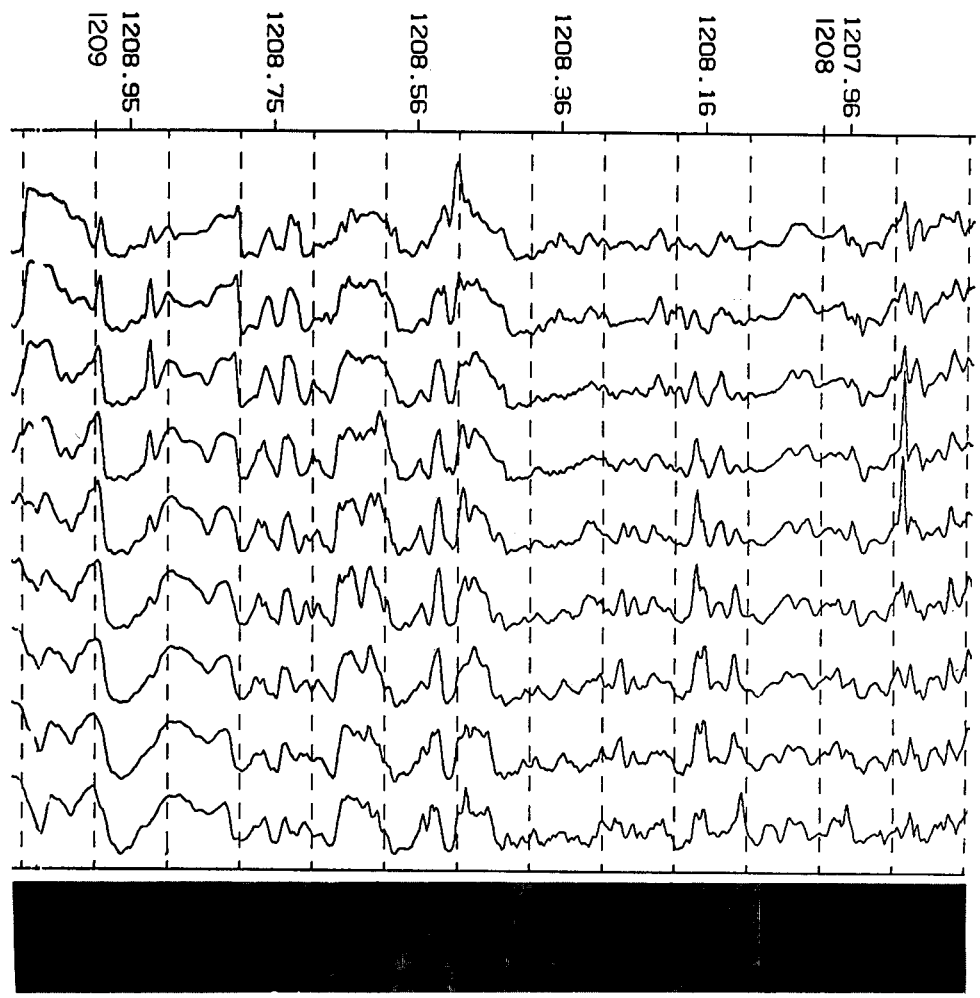
Figure 5C:
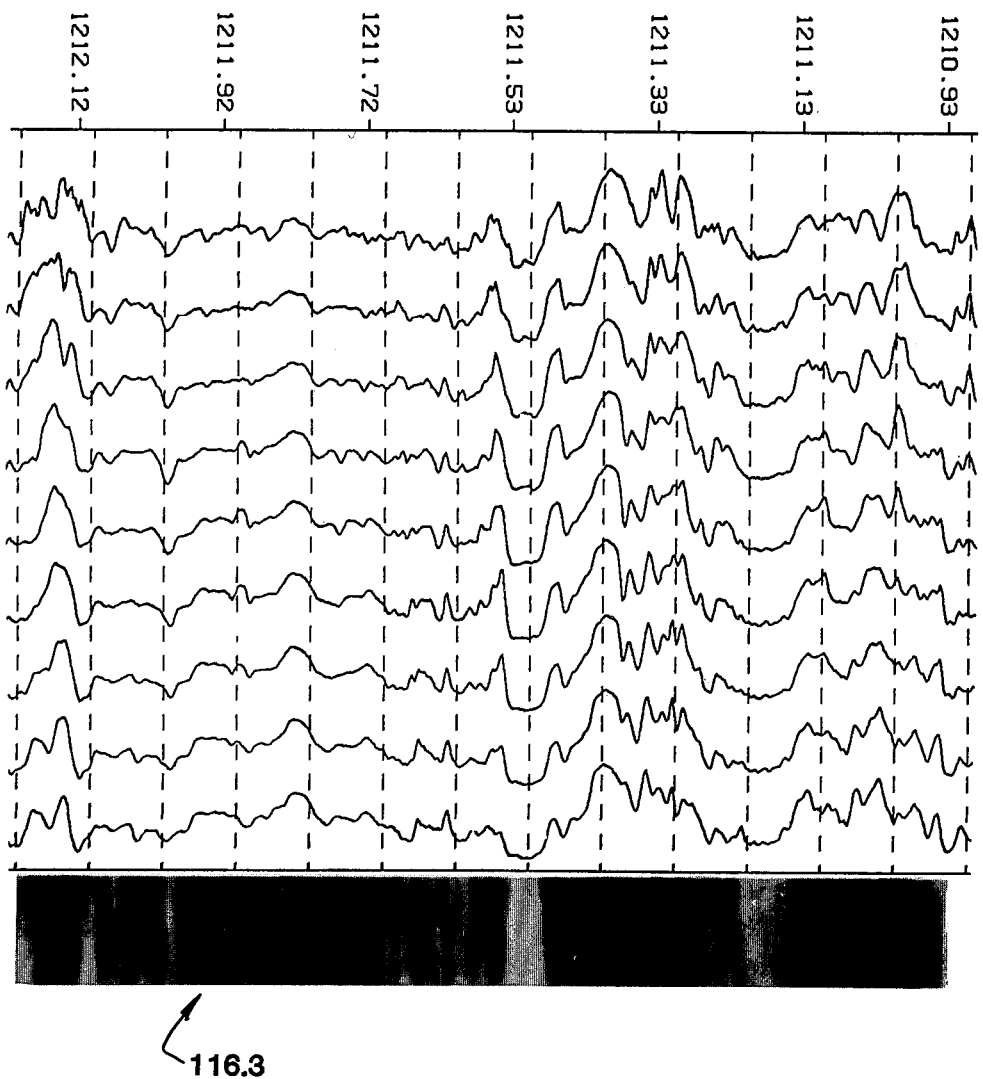
Figure 5D:
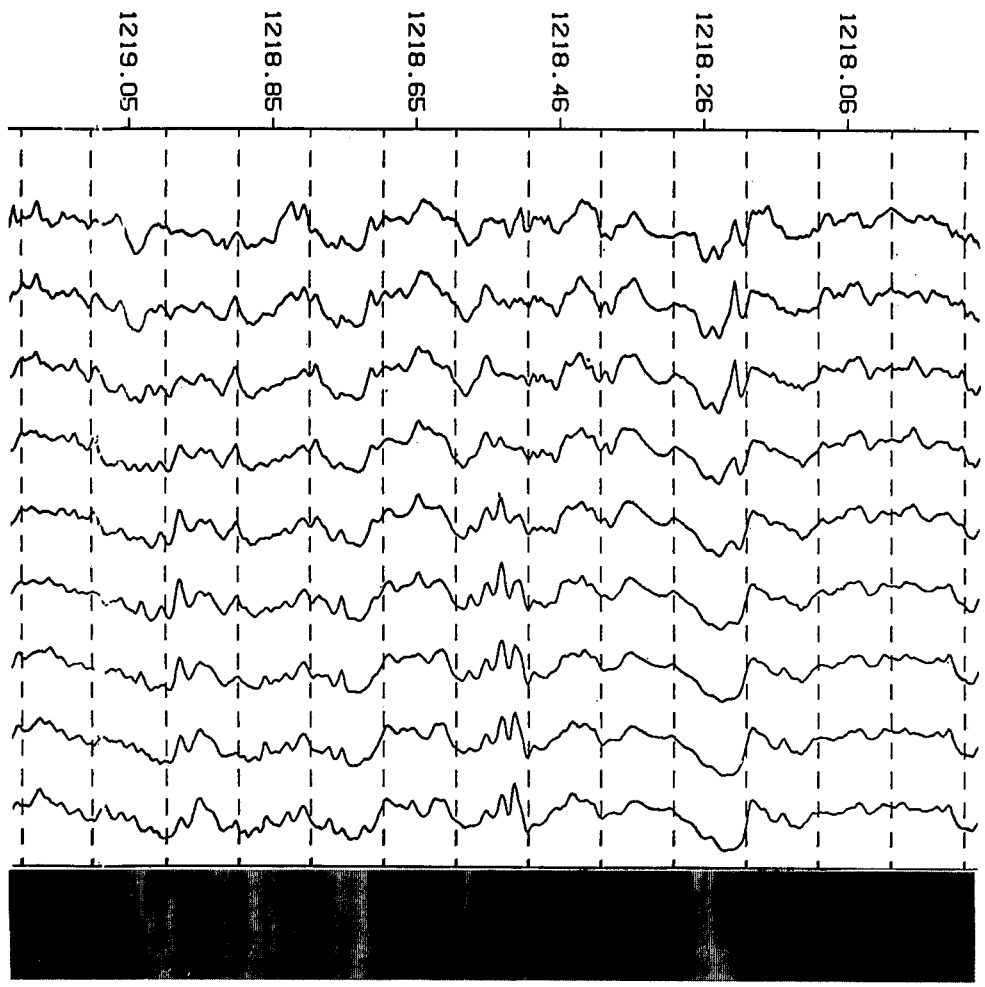
Figure 5E:
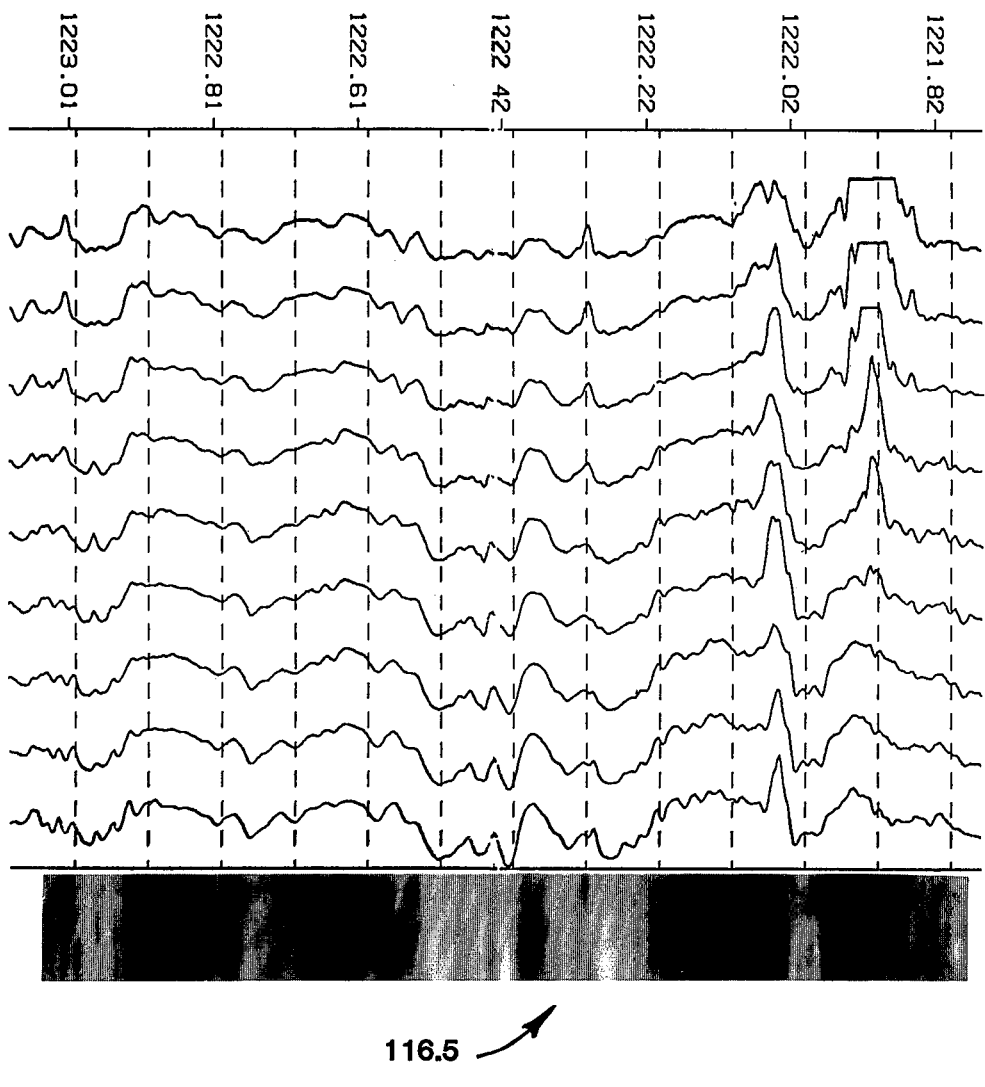

The advantages of an image log 10 in accordance with the invention resides in the ease with which significant features can be observed. In FIG. 5 various image log portions 116.1–116.5 are illustrated for different depths alongside corresponding line traces. Thus at depths 1194–1195, FIG. 5A, alternating shale limestone layers are evident and form a basal zone, above which at shallower levels, a lower porosity region such as shown in the image log 10 of FIG. 1 is located. At depth 1208 in FIG. 5B a low porosity limestone is present. Most of the conductivity contrasts are thought to be due to vugs (see the black splotches at depth 1209 (FIG. 5B), 1212.1 (FIG. 5C) and 1222 (FIG. E)) with lenses, small beds, distributed throughout, and small scale laminations such as at depth 1218.5 (FIG. 5D). These various features are difficult to derive from the line traces shown alongside the image logs of these Figures. Yet these features are particularly important because the analysis of vugs, lenses and laminations may indicate the general way in which pore space and nonporous rock are distributed in a reservoir. Such analysis is of major importance in a permeability assessment involving the flow characteristics suitable for hydrocarbon production.

The image logs 10 of FIG. 1 and 116 of FIGS. 5A–5E are particularly effective due to the removal of artifacts such as from incorrect tool depth measurements or from gain variations in the various amplifiers used to process parameter signals, tool pad tilt, rugosity of the borehole, stand-off, etc. Special techniques have been implemented to visually enhance significant features. For example, with reference to FIG. 3 the rows of conductivity samples $S_{1-N}$ from step 100 can be laterally expanded by calculating additional intermediate values between the samples and recording all of the samples as an image log on which the circumferential dimension of the log has been magnified at 120. A magnification factor of six was used in the image logs of FIGS. 1 and 5.

Another enhancement of the image log's perception may be obtained by applying the conductivity samples at 122 through a non-linear transformation selected to determine grey intensity levels that optimize visual information for subsequent inspection by a human interpreter.

Figure 6:
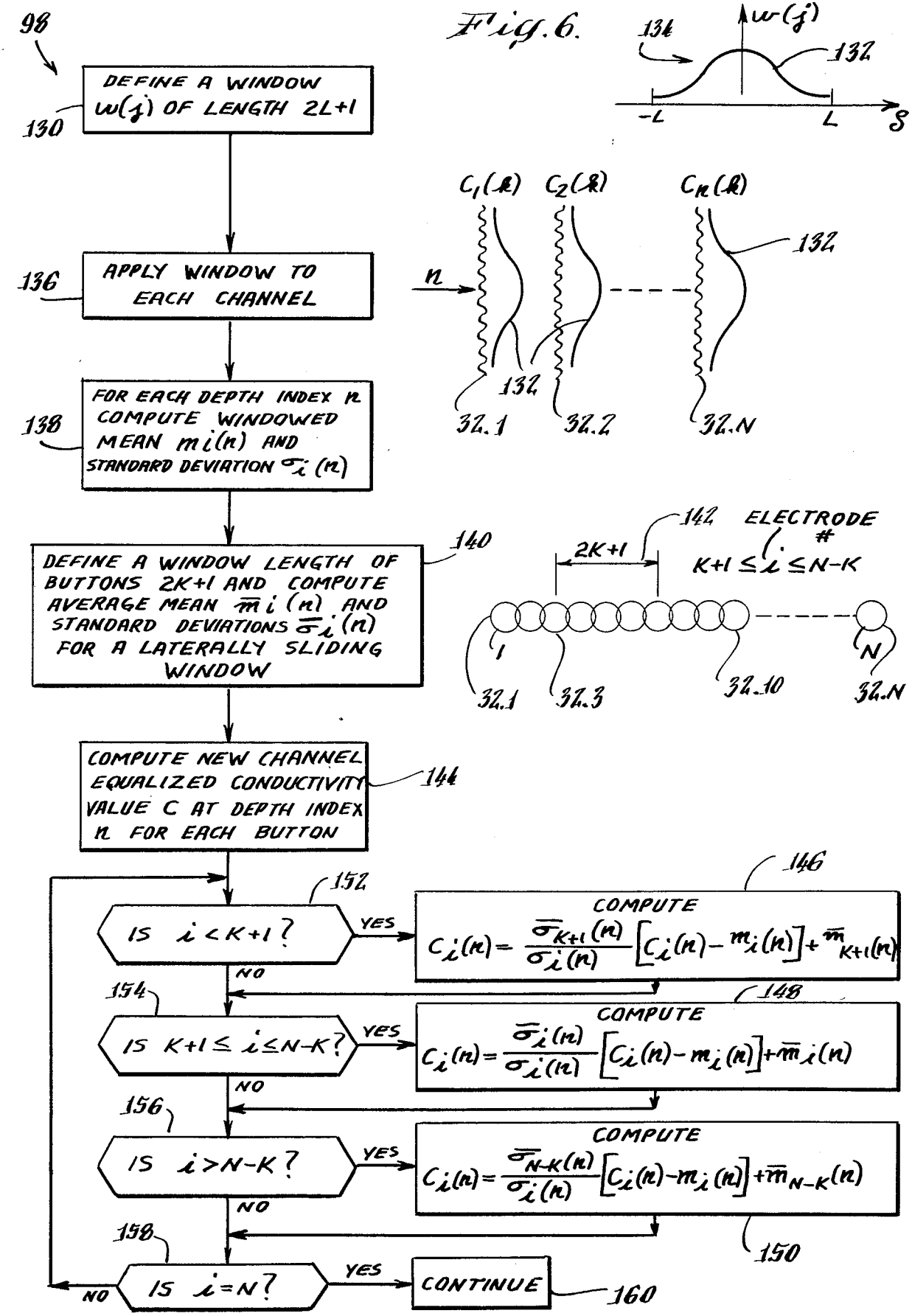
FIG. 6 is a flow chart for a technique used to remove inequalities in the measurement acquisition part of the system.

The equalizing technique 98 of FIGS. 3 and 6 operates to equalize for artifacts in the form of a longitudinal shadow-like pattern of light and dark regions on the image log. Such shadow pattern is in effect transformed to a uniform background. At 130 a window 132 is defined, preferably the one known as a Hamming window, having an amplitude tapering shape as generally shown at 134. The window length is a predetermined odd number of depth samples $2L+1$. At 136 the same window 132 is applied to each conductivity channel, which represents the conductivity measurements from respective individual electrodes 32. The window is centered at a common depth (n) for all channels as shown at 132 and the windowed mean $m_i(n)$ computed as well as the standard deviation $\sigma_1(n)$ about the mean at 138. These latter mean and deviation determinations are for conductivity values both above and below the index n.

At 140 a lateral or circumferential window length 142 of $2K+1$ buttons 32 is defined and the average mean $\overline{m_i}(n)$ and standard deviation $\sigma_i(n)$ about that mean is computed for a laterally sliding window. The value for K may, for example, be equal to two. At the left edge the window centered at the $K+1$ electrode 32 is used to equalize the first $K+1$ electrodes. Similarly, at the right edge, the window centered at the $N-K$ electrode is used to equalize the measurements made with the electrodes from $N-K$ to N.

At 144 new channel equalized conductivity values are formed using the mean and deviation values previously calculated by steps 138 and 140. These conductivity values $C_i(n)$ are determined according to the relationships set forth in FIG. 6 at 146, 148 and 150. Which relationship is used depends upon which button is being equalized, i.e. whether $i \leq K+1$, $K+1 \leq i \leq N-K$, or $i > N-K$. Hence, the buttons located near the edges of the row, i.e. the outer two, employ the mean and standard deviations determined at 138 for a button that is not near the edge, the $K+1$ button. This reduces edge effects of the array 30 and provides an even edge appearance of the image log. Tests for determining which equalization computation to use are set forth at 152, 154 and 156. When the appropriate equalized conductivity values have been determined for all electrodes 32, at depth index n as determined by a test at 158, the processing of the conductivity values for the depth index (n) is continued at 160 for all remaining depth indices n after which the signal compression step 100 as more particularly shown in FIG. 7 is commenced.

The compression technique 100 is employed to accommodate the large dynamic range of conductivity values $C_i(n)$. If the full range were to be displayed on the image logs in FIGS. 1 and 5, the large conductivity contrasts between different types of earth formations would obscure local details. Accordingly, at 170 in FIG. 7 a vertical window is defined of length of $2L+1$ depth samples. This window may be of the same Hamming type as described with reference to step 130 in FIG. 6. A desired grey scale level, E' that is a portion of the full grey scale of the image log such as 10 is selected at 172 as the grey scale level about which the fine details of an image log are likely to be observed. This grey scale level E' may, for example, be half of full scale or such other fractional value as appears desirable for visual analysis of the image log.

At 174 an average windowed rms energy E(n) is computed about the depth index n for all N buttons 32 in the circumferential row for that depth. A scale factor, the inverse value $S'_f$, is then computed at 176 for the depth index n and all conductivity values at depth index n multiplied by this inverse scale factor at 178.

By recording the scale factor $S'_f$ or $S_f$ at 182 along an image log such as 10 or at 104 in FIG. 4, information of the absolute conductivity levels represented by the grey scale can be derived.

The image interpolation technique 120 of FIG. 3 can be carried out using an interpolation scheme as diagrammatically illustrated in FIG. 8 and carried out in the manner of FIG. 9. Because of overlapping of the formation areas investigated by the electrodes 32, the preferred interpolation function is a Sin x/x curve 188 having a main lobe as illustrated at 190 and negative and positive side lobes as shown, for example, at 192 and 194. The zero cross-overs of curve 188 are selected to occur at a regular spacing, $\Delta N$, that coincides with the spacing between adjacent buttons 32 when depth shifted to a common depth. The interpolation technique 120 generally follows a tapering procedure as more particularly described and incorporated herein by reference thereto in an article entitled "A Digital Signal Processing Approach To Interpolation" by R. W. Schafer and L. R. Rabiner and published in the Proceedings Of The IEEE, Volume 61, No. 6, June 1973. This article proposes use of a tapered window, W, having a shape generally as shown at 195.

The preferred function for interpolating the value of C involves a curve 188 with many side lobes. However, ringing effects develop at the edges as side lobes such as 192 and 194 run off the edges of the row of samples. Accordingly, the window W is shortened as the Sin x/x function curve approaches an edge as illustrated in FIG. 8. This gradual shortening of the sample width of the interpolation function by adjusting the length of window W assures that the lateral expansion of the image log such as 10 does not exhibit undesirable artifacts at edges of the log.

The interpolation technique 200 may be carried out as shown in FIG. 8 starting at 200 followed at 202 with a determination of where the value of x lies relative to adjacent conductivity samples $C_i$. On the basis of this position determination the proper window weighting function is selected at 204. The interpolation value for C at x is then determined at 206 using the relationship as illustrated. At 208 a test is made whether all interpolation values needed for lateral expansion of the log have been computed. If not, the process as described is repeated until the test can be answered affirmatively.

When all interpolation values x have been determined, the common depth row of conductivity samples exceeds the number of electrodes 32. This represents an image expansion for an improved visual image of the circumferential earth formation segment that has been investigated and facilitates evaluations and interpretations. The image logs of FIGS. 1 and 5 have been so laterally expanded by a factor selected such that the circumferential or lateral scale exceeds the depth scale by a factor of six.

Having thus explained a technique for making image logs in accordance with the invention, its advantages can be appreciated. Significant earth formation features become observable that are effectively impossible to detect from conventional line tracings. The invention has been described herein as particularly useful with a high resolution investigation using current electrodes. However, other earth formation characteristics may be so imaged such as acoustic information derived with an array of high resolution acoustic transducers. Other parameters may be recorded alongside image log 10, for example, by displaying at 224 in FIG. 1 the inclination angle $\theta$ or drive voltage $V_{EMEX}$ or other formation investigations.

Variations from the described embodiment can be made without departing from the scope of the invention.

What is claimed is:

1. A method for generating a log of fine features of a borehole wall with a tool that is suspended from a cable inside the borehole which penetrates an earth formation comprising the steps of:
   generating signals which represent a high spatial resolution measurement of a characteristic of said borehole wall and in the aggregate represent comparable high resolution features of said characteristic over an effectively continuous vertical and circumferential segment of the borehole wall;
   generating high resolution depth signals representative of the borehole depths to which said high spatial resolution characteristic signals relate;
   converting said characteristic signals with said depth signals to produce said characteristic signals as a function of borehole depth;
   deriving from said latter signals, signals which represent said characteristic as a linear function of borehole depth;
   generating grey scale values of said latter signals for the display of fine features of the characteristic;
   forming from said grey scale values a visual image of said effectively continuous segment of the borehole as a linear function of borehole depth wherein the image has a grey scale with which fine features of the characteristic of said segment of the borehole wall are visually enhanced.

2. The method for generating an image log as claimed in claim 1 wherein said depth signals generating step includes the steps of:
   generating signals representative of the cable depth of the tool;
   generating signals representative of accelerations of the tool;
   determining when the tool is motionless and generating a signal indicative thereof; and
   deriving from said cable depth signals, the acceleration signal and the motionless signal, said depth signals with a high spatial depth resolution that is commensurate with the high spatial resolution of said characteristic signals.

3. The method for generating a log as claimed in claim 1 and further comprising the step of:
   modifying signals representative of said borehole wall characteristic prior to forming said visual image as a peredetermined function of measured deviations of said latter signals from averages thereof as determined over borehole wall regions in the vicinities of the locations to which respective ones of the signals relate so as to equalize said signals for variations attributable to factors such as the borehole environment, tool tilt, or unequal processing of signals generated with the tool.

4. The method for generating a log as claimed in claim 3 wherein the modifying step further comprises the steps of:
   forming, for characteristic signals related to common depth intervals and respectively to different circumferential locations of the borehole wall segment, predetermined first averages and first deviations from said averages of said latter signals for a preselected number of locations extending above and below the common depth intervals;
   respectively combining said predetermined first averages and first deviations for a preselected number of circumferentially spaced locations at said common depth intervals to form second averages and second deviations of said signals; and
   altering each signal related to a circumferential location at said common depth intervals in a predetermined manner with said first and second averages and first and second deviations to equalize said variations in said signals.

5. The method for generating a log as claimed in claim 1 and further comprising the step of:
   modifying each one signal, which is related to a borehole depth and to a circumferential location of the segment of the borehole wall, as a function of an average and a deviation from said average of a set of signals related to a preselected portion of the borehole wall segment and which portion effectively surrounds the location to which said one signal relates, so as to equalize said signals, prior to forming said visual image, for variations therein and attributable to factors such as the borehole environment, tool tilt, or unequal processing of signals with the tool.

6. The method for generating a log as claimed in claim 1 and further comprising the step of:
   determining an average of the signals representative of the characteristic of the borehole wall as a function of depth over a predetermined depth range of the borehole wall segment;
   selecting a reference value representative of a visually desirable grey scale level for the image log;
   forming a grey scale factor with the reference value and said average value; and
   modifying signals representative of said characteristic as a function of the grey scale factor to maintain the grey scale of the image log within a visually usable range.

7. The method for generating a log as claimed in claim 6 and further comprising the step of recording said grey scale factor alongside said image log.

8. The method for generating a log as claimed in claim 1 and further comprising the step of:
laterally expanding the image log to present a smaller scale with greater detail in the circumferential direction.

9. The method for generating a log as claimed in claim 8 wherein said step of lateral expansion of the image log includes the step of:
producing at common depth intervals characteristic signals for circumferential locations which lie between the locations to which the initially generated characteristic signals relate.

10. A method for generating a log of fine conductivity features of a borehole wall with a tool that is suspended from a cable inside the borehole which penetrates an earth formation and which tool has a plurality of survey electrodes arranged in multiple rows in a predetermined overlapping manner to investigate a circumferentially continuous segment of the borehole wall with high spatial resolution comprising the steps of:
generating high spatial resolution conductivity signals whose amplitudes represent the conductivity of the borehole wall opposite the survey electrodes with the conductivity signals in the aggregate representing conductivity of an effectively continuous vertical and circumferential segment of the borehole wall;
converting said conductivity signals to high spatial resolution conductivity signals which represent the conductivity of said borehole wall segment as a linear function of borehole depth; and
forming from said latter conductivity signals a visual image of said effectively continuous borehole segment as a linear function of borehole depth and with a grey scale with which fine conductivity features indicative of stratigraphy, vugs, and fractures present in the borehole wall segment are visually enhanced.

11. The method for generating a log as claimed in claim 10 wherein said converting step further includes the steps of:
generating high resolution depth signals representative of the borehole depths to which said high spatial resolution conductivity signals relate;
converting said conductivity signals with said depth signals to produce conductivity signals as a function of borehole depth; and
deriving from said latter signals conductivity signals as a linear function of borehole depth.

12. The method for generating a log as claimed in claim 11 wherein said deriving step includes the step of:
resampling the conductivity signals that were converted at regular depth intervals.

13. The method for generating a log as claimed in claim 11 wherein said step for generating depth signals further comprises:
generating signals representative of the cable depth of the tool;
generating signals representative of accelerations of the tool;
determining when the tool is motionless and generating a signal indicative thereof; and
deriving from said cable depth signals the acceleration signals and the motionless signal, said depth signals with a high spatial depth resolution that is commensurate with the high spatial resolution of said conductivity signals.

14. The method for generating a log as claimed in claim 13 wherein said converting step includes the step of depth shifting the conductivity signals generated by different rows of electrodes and related to common depth intervals to produce sets of conductivity signals which represent the conductivity of the borehole wall segment effectively over a continuous circumferential dimension and with said high spatial resolution.

15. The method for generating a log as claimed in claim 14 and further comprising the step of:
modifying conductivity signals representative of said borehole wall conductivity at specific locations as a predetermined function of measured deviations of said latter signals from averages thereof as determined over borehole wall regions in the vicinities of the locations to which respective ones of the signals relate so as to equalize said signals, prior to forming said visual image, for variations attributable to factors such as the borehole environment or unequal processing for signals generated with the tool.

16. The method for generating a log as claimed in claim 15 and further comprising the step of:
generating electrode drive voltage signals;
applying the electrode drive voltage signal to the conductivity signals of corresponding depths to produce signals that are representative of the actual conductivity and resistivity of said borehole wall segment.

17. The method for generating a log as claimed in claim 16 and further comprising the steps of:
determining an average of the signals representative of the actual conductivity and resistivity of the borehole wall segment;
selecting a reference value representative of a visually desirable grey scale level for the image log;
forming a grey scale factor with the reference value and said average value; and
modifying the signals representative of actual conductivity and resistivity to maintain the grey scale of the image log within a visually usable range.

18. The method for generating a log as claimed in claim 17 and further comprising the step of recording said grey scale factor alongside said image log.

19. The method for generating a log as claimed in claim 17 and further comprising the step of:
laterally expanding the image log.

20. The method for generating a log as claimed in claim 19 wherein said lateral expanding step further comprises:
producing at common depth intervals conductivity signals for circumferential locations which lie between initial locations to which the conductivity signals from the survey electrodes relate.

21. The method for generating a log as claimed in claim 20 wherein said lateral expanding step further includes the steps of:
selecting the number of intermediate conductivity signals to be produced for locations that lie between said initial locations; and
deriving the values of said intermediate conductivity signals in accordance with a predetermined relationship.

22. A method for generating a log of fine features of a borehole wall with a tool that is suspended from a cable inside the borehole which penetrates an earth formation comprising the steps of:

generating signals which represent a high spatial resolution measurement of a characteristic of said borehole wall and in the aggregate represent comparable high resolution features of said characteristic over an effectively continuous vertical and circumferential segment of the borehole wall;

generating signals representative of the cable depth of the tool;

generating signals representative of the accelerations of the tool;

determining when the tool is motionless and generating a signal indicative thereof;

deriving from said cable depth signals, the acceleration signal and the motionless signal, said depth signals with a high spatial resolution that is commensurate with the high spatial resolution of said characteristic signals; and modifying signals representative of said borehole wall characteristic as a predetermined function of measured deviations of said latter signals from averages thereof as determined over borehole wall regions in the vicinities of the locations to which respective ones of the signals relate so as to equalize said signals for variations attributable to factors such as the borehole environment or unequal processing of signals generated with the tool.

23. A method for generating a log of fine features of a borehole wall with a tool that is suspended from a cable inside the borehole which penetrates an earth formation comprising the steps of:

generating signals which represent a high spatial resolution measurement of a characteristic of said borehole wall and in the aggregate represent comparable high resolution features of said characteristic over an effectively continuous vertical and circumferential segment of the borehole wall;

generating signals representative of the cable depth of the tool;

generating signals representative of the accelerations of the tool;

determining when the tool is motionless and generating a signal indicative thereof;

deriving from said cable depth signals, the acceleration signal and the motionless signal, said depth signals with a high spatial resolution that is commensurate with the high spatial resolution of said characteristic signals;

modifying signals representative of said borehole wall characteristic as a predetermined function of measured deviations of said latter signals from averages thereof as determined over borehole wall regions in the vicinities of the locations to which respective ones of the signals relate so as to equalize said signals for variations attributable to factors such as the borehole environment or unequal processing of signals generated with the tool;

determining an average of the signals representative of the characteristic of the borehole wall as a function of depth over a predetermined depth range of the borehole wall segment;

selecting a reference value representative of a visually desirable grey scale level for the image log;

forming a grey scale factor with the reference value and said average value;

modifying signals representative of said characteristic as a function of the grey scale factor to maintain the grey scale of the image log within a visually usable range; and recording said grey scale factor alongside said image log.

24. An apparatus for generating a log of fine features of a borehole wall as a function of depth with a signal processor from an investigation of a borehole wall with a tool that is suspended from a cable inside the borehole which penetrates an earth formation comprising:

means for producing a plurality of high spatial resolution signals respectively representative of a characteristic of the borehole wall and which signals in the aggregate represent high resolution features of said characteristic over an effectively continuous vertical and circumferential segment of the borehole wall;

means for converting said high spatial resolution signals to signals which represent said characteristic as a linear function of depth; and means for producing a visual image of said continuous borehole segment with said latter converted signals with the image intensity related to the characteristic, said visual image extending as a linear function of borehole depth with the lateral image positions of the signals being in correspondence with the circumferential locations to which the signals relate so as to form, of the measured characteristic along the borehole wall segment, a visual image that in the aggregate enhances visual recognition of significant fine features of said borehole wall segment.

25. The apparatus for generating a log as claimed in claim 24 wherein said converting means further comprises:

means for measuring the depth of the tool in the borehole with the same order of resolution as that employed with the measurement of said characteristic and producing depth signals indicative thereof.

26. The apparatus for generating a log as claimed in claim 25 and further comprising:

means for equalizing said signals for variations attributable to factors such as the borehole environment or unequal processing of the signals generated with the tool.

27. The apparatus for generating a log as claimed in claim 26 wherein the visual image producing means includes:

means for laterally expanding the number of signals at regular depth intervals.

28. The apparatus for generating a log as claimed in claim 26 wherein said visual image producing means further includes:

means for generating a scale factor signal representative of an amplitude of the image over a predetermined depth range thereof; and means for modifying the signals in accordance with said scale factor to produce said visual image with intensity variations within a visually observable range.

* * * * *